United States Patent
Dunning et al.

(10) Patent No.: US 10,872,293 B2
(45) Date of Patent: Dec. 22, 2020

(54) DEEP REINFORCEMENT LEARNING WITH FAST UPDATING RECURRENT NEURAL NETWORKS AND SLOW UPDATING RECURRENT NEURAL NETWORKS

(71) Applicant: DeepMind Technologies Limited, London (GB)

(72) Inventors: Iain Robert Dunning, New York, NY (US); Wojciech Czarnecki, London (GB); Maxwell Elliot Jaderberg, London (GB)

(73) Assignee: DeepMind Technologies Limited, London (GB)

( * ) Notice: Subject to any disclaimer, the term of this patent is extended or adjusted under 35 U.S.C. 154(b) by 0 days.

(21) Appl. No.: 16/425,717

(22) Filed: May 29, 2019

(65) Prior Publication Data

US 2019/0370637 A1 Dec. 5, 2019

Related U.S. Application Data

(60) Provisional application No. 62/677,632, filed on May 29, 2018.

(51) Int. Cl.
  *G06F 17/18* (2006.01)
  *G06N 3/08* (2006.01)
  *G06N 3/04* (2006.01)

(52) U.S. Cl.
  CPC .......... *G06N 3/0454* (2013.01); *G06F 17/18* (2013.01); *G06N 3/0472* (2013.01); *G06N 3/08* (2013.01)

(58) Field of Classification Search
  None
  See application file for complete search history.

(56) References Cited

U.S. PATENT DOCUMENTS

2018/0268286 A1* 9/2018 Dasgupta ................. G06N 3/08

OTHER PUBLICATIONS

Chung, Junyoung et al. "Hierarchical Multiscale Recurrent neural Networks" ICLR 2017 [Published 2017] [Retrieved Online Oct. 2019] <URL: https://arxiv.org/pdf/1609.01704.pdf> (Year: 2017).*
Vezhnevets, Alexander et al. "Strategic Attentive Writer for Learning Macro-Actions" NIPS 2016 [Published 2016] [Retrieved Online Oct. 2019] <URL: http://papers.nips.cc/paper/6414-strategic-attentive-writer-for-learning-macro-actions.pdf> (Year: 2016).*
Jaderberg, Max et al. "Decoupled Neural Interfaces using Synthetic Gradients" arXiv V1 2016 [Published 2016] [Retrieved online Oct. 2019] <URL: https://arxiv.org/pdf/1608.05343v1.pdf> (Year: 2016).*

(Continued)

*Primary Examiner* — Ann J Lo
*Assistant Examiner* — Fen Christopher Tamulonis
(74) *Attorney, Agent, or Firm* — Fish & Richardson P.C.

(57) ABSTRACT

Methods, systems, and apparatus, including computer programs encoded on computer storage media, for reinforcement learning. One of the methods includes selecting an action to be performed by the agent using both a slow updating recurrent neural network and a fast updating recurrent neural network that receives a fast updating input that includes the hidden state of the slow updating recurrent neural network.

30 Claims, 8 Drawing Sheets

(56) References Cited

OTHER PUBLICATIONS

Duan, Yan et al. "RL2: Fast Reinforcement Learning via Slow Reinforcement Learning" ICLR 2017 [Published 2016] [Retrieved Oct. 2019] <URL: https://arxiv.org/pdf/1611.02779.pdf> (Year: 2016).*
Peng, Peng et al. "Multiagent Bidirectionally-Coorinated Nets" arXiv 2017 [Published 2017] [Retrieved Online Oct. 2019] <URL: https://arxiv.org/pdf/1703.10069.pdf> (Year: 2017).*
Schlag, Imanol et al. "Gated Fast Weights for On-The-Fly Neural Program Generation" NIPS 2017 [Published 2017] [Retrieved Oct. 2019] <URL: http://metalearning.ml/2017/papers/metalearn17_schlag.pdf> (Year: 2017).*
Lample, Guillaume et al. "Playing FPS Games with Deep Reinforcement Learning" AAAI 2017, Version 1 arXiv [Published 2016] [ Retrieved Oct. 2019] <URL: https://arxiv.org/pdf/1609.05521v1.pdf> (Year: 2016).*
Mujika, Asier et al. "Fast-slow recurrent neural networks." NIPS 2017 [Published 2017] [Retrieved Oct. 2019] <URL: http://papers.nips.cc/paper/7173-fast-slow-recurrent-neural-networks.pdf> (Year: 2017).*
El Hihi, Salah et al. "Hierarchical Recurrent Neural Networks for Long-Term Dependencies" NIPS 1996 [Published 1996] [Retrieved Oct. 2019] <URL: https://papers.nips.cc/paper/1102-hierarchical-recurrent-neural-networks-for-long-term-dependencies.pdf> (Year: 1996).*
Hwang, Kyuyeon et al. "Character-Level Language Modeling with Hierarchical Recurrent Neural Networks." ICASSP 2017 [ Published 2017] [Retrieved Oct. 2019] <URL: https://ieeexplore.ieee.org/abstract/document/7953252> (Year: 2017).*
Paine, Rainer et al. "Motor primitive and Sequence self-organization in a hierarchical recurrent neural network." Neural Networks vol. 17 Is. 8-9 [Published 2004] [Retrieved Oct. 2019] <URL: https://www.sciencedirect.com/science/article/pii/S0893608004001595> (Year: 2004).*
Foerster, Jakob et al. "Learning to Communicate to Solve Riddles with Deep Distributed Recurrent Q-Networks" arXiv 2016 [ Published 2016] [Retrieved Oct. 2019] <URL: https://arxiv.org/abs/1602.02672> (Year: 2016).*
El Sallab, Ahmad et al. "Deep Reinforcement Learning framework for Autonomous Driving." ISEI 2017 [Published 2017] [Retrieved Oct. 2019] <URL: https://arxiv.org/pdf/1704.02532.pdf> (Year: 2017).*
Andrychowicz, Marcin et al. "Learning to learn by gradient descent by gradient descent" NIPS 2016 [Published 2016] [Retrieved Oct. 2019] <URL: https://arxiv.org/abs/1606.04474> (Year: 2016).*
Zhan, Eric et al. "Generative Multi-Agent Behavioral Cloning" arXiv 2018 Version 5 [Published May 20, 2018] [Retrieved Oct. 2019] <URL: https://arxiv.org/abs/1803.07612v5> (Year: 2018).*
Leon, Aurelia et al. "Options Discovery with Budgeted Reinforcement Learning" arXiv version 3 [Published 2017] [Retrieved Oct. 2019] <URL: https://arxiv.org/abs/1611.06824> (Year: 2017).*
Tuyen, Le Pham et al. "Deep Hierarchical Reinforcement Learning Algorithm in Partially Observable Markov Decision Processes" arXiv 2018 [Published May 11, 2018] [Retrieved Oct. 2019] <URL: https://arxiv.org/abs/1805.04419> (Year: 2018).*
Tessler, Chen et al. "A Deep Hierarchical Approach to Lifelong Learning in Minecraft" arXiv 2016 [Published 2016] [Retrieved Oct. 2019] <URL: https://arxiv.org/abs/1604.07255> (Year: 2016).*
Lowe, Ryan et al. "Multi-Agent Actor-Critic for Mixed Cooperative-Competitive Environments." NIPS 2017 [Published 2017] [Retrieved Oct. 2019] <URL: https://papers.nips.cc/paper/7217-multi-agent-actor-critic-for-mixed-cooperative-competitive-environments.pdf> (Year: 2017).*
Andreas, Jacob et al. "Modular Multi-task Reinforcement Learning with Policy Sketches." PMLR 2017 [Published 2017] [Retrieved Oct. 2019] <URL: https://arxiv.org/pdf/1611.01796.pdf> (Year: 2017).*
Koutnik, Jan et al. "A Clockwork RNN" arXiv:1402.3511 [Published 2014] [Retrieved Oct. 2019] <URL: https://arxiv.org/abs/1402.3511> (Year: 2014).*
Zhang, Xingxing et al. "Sentence Simplification with Deep Reinforcement Learning" EMNLP 2017 [Published 2017] [Retrieved Oct. 2019] <URL: https://arxiv.org/abs/1703.10931> (Year: 2017).*
Foerster, Jakob et al. "Learning to Communicate with Deep Multi-Agent Reinforcement Learning." arXiv:1605.06676 [Published 2016] [Retrieved Oct. 2019] <URL: https://arxiv.org/pdf/1605.06676.pdf> (Year: 2016).*
Foerster, Jakob et al. "Counterfactual Multi-Agent Policy Gradients" arXiv:1705.08926 V1 [Published 2017] [Retrieved Oct. 2019] <URL: https://arxiv.org/abs/1705.08926v1> (Year: 2017).*
Oh et al., "Zero-shot Task Generalization with Multi-Task Deep Rinforcement Learning," arXiv.org/1706.05064, Nov. 2017, 21 pages.
PCT International Search Report and Written Opinion in International Appln. No. PCT/EP2019/063970, dated Nov. 14, 2019.
Ackley et al., "Interactions between learning and evolution." Artificial life II 10, 1991, 23 pages.
Bacon et al., "The option-critic architecture." Thirty-First AAAI Conference on Artificial Intelligence, Feb. 13, 2017, 9 pages.
Bansal et al., "Emergent complexity via multi-agent competition." arXiv preprint arXiv:1710.03748, Oct. 10, 2017, 12 pages.
Beattie et al., "Deepmind lab." arXiv preprint arXiv:1612.03801, Dec. 12, 2016, 11 pages.
Bérard et al., "On the Limits of the Human Motor Control Precision: the Search for a Device's Human Resolution."
Bernstein et al., "The complexity of decentralized control of Markov decision processes." Mathematics of operations research 27.4 Nov. 27, 2002, 6 pages.
Bowman et al., "Generating sentences from a continuous space." arXiv preprint arXiv:1511.06349, Nov. 19, 2015, 12 pages.
Castel et al., "The effects of action video game experience on the time course of inhibition of return and the efficiency of visual search." Acta psychologica 119.2, Jun. 1, 2005, 14 pages.
Chen et al., "Processing timescales as an organizing principle for primate cortex." Neuron 88, Oct. 21, 2015, 3 pages.
Chung et al. "A recurrent latent variable model for sequential data." Advances in neural information processing systems, 2015, 9 pages.
Chung et al., "Hierarchical multiscale recurrent neural networks." arXiv preprint arXiv:1609.01704, Sep. 6, 2016, 13 pages.
El Hihi et al., "Hierarchical recurrent neural networks for long-term dependencies." Advances in neural information processing systems, 1996, 7 pages.
Ermi et al., "Fundamental components of the gameplay experience: Analysing immersion." Worlds in play: International perspectives on digital games research 37.2, May 30, 2005, 14 pages.
Espeholt et al., "Impala: Scalable distributed deep-rl with importance weighted actor-learner architectures." arXiv preprint arXiv:1802.01561, Feb. 5, 2018, 22 pages.
Foerster et al., "Learning with opponent-learning awareness." Proceedings of the 17th International Conference on Autonomous Agents and MultiAgent Systems. International Foundation for Autonomous Agents and Multiagent Systems, Jul. 9, 2018, 14 pages.
Fraccaro et al., "Sequential neural models with stochastic layers." Advances in neural information processing systems, 2016, 9 pages.
Gerald Tesauro., "Temporal difference learning and TD-Gammon." Communications of the ACM 38.3, Mar. 2, 1995, 16 pages.
Graves et al., "Hybrid computing using a neural network with dynamic external memory." Nature 538.7626, Oct. 2016, 64 pages.
Green et al., "Action video game training for cognitive enhancement." Current Opinion in Behavioral Sciences 4, Aug. 1, 2015, 7 pages.
Hassabis et al., "Neuroscience-inspired artificial intelligence." Neuron 95.2, Jul. 19, 2017, 14 pages.
Hausknecht et al., "Deep reinforcement learning in parameterized action space." arXiv preprint aiXiv:1511.04143, Nov. 13, 2015, 12 pages.
Heinrich et al., "Deep reinforcement learning from self-play in imperfect-information games." arXiv preprint arXiv:1603.01121, Mar. 3, 2016, 10 pages.
Hinton et al., "Neural networks for machine learning lecture 6a overview of mini-batch gradient descent." Cited on Aug. 14, 2012, 31 pages.
Hochreiter et al.,"Long short-term memory." Neural computation 9.8, Nov. 15, 1997, 32 pages.

(56) References Cited

OTHER PUBLICATIONS

J. P. V. Waveren., "The Quake III arena bot." Unpublished master's thesis, University of Technology Delft, Jun. 2001, 118 pages.
Jaderberg et al., "Population based training of neural networks." arXiv preprint arXiv:1711.09846, Nov. 27, 2017, 21 pages.
Jaderberg et al., "Reinforcement learning with unsupervised auxiliary tasks." arXiv preprint arXiv:1611.05397, Nov. 16, 2016, 14 pages.
Jeff Orkin, "Three states and a plan: the AI of FEAR." Game Developers Conference. vol. 2006.
Kingma et al., "Auto-encoding variational bayes." arXiv preprint arXiv:1312.6114, Dec. 20, 2013, 14 pages.
Kitano et al., "Robocup: A challenge problem for ai and robotics." Robot Soccer World Cup. Springer, Berlin, Heidelberg, Aug. 23, 1997, 19 pages.
Koutnik et al., "A clockwork rnn." arXiv preprint arXiv:1402.3511, Feb. 14, 2014, 9 pages.
Krakauer et al., "Neuroscience needs behavior: correcting a reductionist bias." Neuron 93.3, Feb. 8, 2017, 11 pages.
Laird et al., "Human-level AI's killer application: Interactive computer games." AI magazine 22.2, Jun. 15, 2001, 12 pages.
Lample et al., "Playing FPS games with deep reinforcement learning." Thirty-First AAAI Conference on Artificial Intelligence, Feb. 13, 2017, 7 pages.
Lanctot et al., "A unified game-theoretic approach to multiagent reinforcement learning." Advances in Neural Information Processing Systems, 2017, 14 pages.
Leibo et al., "Multi-agent reinforcement learning in sequential social dilemmas." Proceedings of the 16th Conference on Autonomous Agents and MultiAgent Systems. International Foundation for Autonomous Agents and Multiagent Systems, May 8, 2017.
Levine et al., "Variational policy search via trajectory optimization." Advances in neural information processing systems, 2013, 9 pages.
Lillicrap et al., "Continuous control with deep reinforcement learning." arXiv preprint arXiv:1509.02971, Sep. 9, 2015, 14 pages.
Lowe et al., "Multi-agent actor-critic for mixed cooperative-competitive environments." Advances in Neural Information Processing Systems, 2017, 12 pages.
Maaten et al., "Visualizing data using t-SNE." Journal of machine learning research, Nov. 9, 2008, 27 pages.
MacAlpine et al., "UT Austin Villa: RoboCup 2017 3D simulation league competition and technical challenges champions." Robot World Cup. Springer, Cham, Jul. 27, 2017, 12 pages.
Matignon et al., "Independent reinforcement learners in cooperative markov games: a survey regarding coordination problems." The Knowledge Engineering Review 27.1, Feb. 27, 2012, 32 pages.
Mnih et al., "Asynchronous methods for deep reinforcement learning." International conference on machine learning, Jun. 11, 2016, 10 pages.
Mnih et al., "Human-level control through deep reinforcement learning." Nature 518.7540, Feb. 2015, 13 pages.
Moravčík et al., "Deepstack: Expert-level artificial intelligence in heads-up no-limit poker." Science 356.6337, May 5, 2017, 37 pages.
Mordatch et al., "Emergence of grounded compositional language in multi-agent populations." Thirty-Second AAAI Conference on Artificial Intelligence, Apr. 25, 2018, 8 pages.
Ng et al., "Policy invariance under reward transformations: Theory and application to reward shaping." ICML. vol. 99, Jun. 27, 1999, 10 pages.
Rezende et al.,"Stochastic backpropagation and approximate inference in deep generative models." arXiv preprint arXiv:1401.4082, Jan. 16, 2014, 14 pages.
Riedmiller et al., "On experiences in a complex and competitive gaming domain: Reinforcement learning meets robocup." 2007 IEEE Symposium on Computational Intelligence and Games. IEEE, Apr. 1, 2007, 7 pages.
Rodrigo Quian Quiroga, "Concept cells: the building blocks of declarative memory functions." Nature Reviews Neuroscience Aug. 13, 2012, 11 pages.
Rosin et al., "New methods for competitive coevolution." Evolutionary computation 5.1, Mar. 5, 1997.
Schmidhuber et al., "Learning complex, extended sequences using the principle of history compression." Neural Computation 4.2, Mar. 4, 1992, 7 pages.
Schulman et al., "Proximal policy optimization algorithms." arXiv preprint arXiv:1707.06347, Jul. 20, 2017, 12 pages.
Silver et al., "Mastering the game of Go with deep neural networks and tree search." nature 529.7587, Jan. 2016, 20 pages.
Silver et al., "Mastering the game of go without human knowledge." Nature 550.7676, Oct. 2017, 42 pages.
Simonyan et al., "Deep inside convolutional networks: Visualising image classification models and saliency maps." arXiv preprint arXiv:1312.6034, Dec. 20, 2013, 8 pages.
Singh et al., "Intrinsically motivated reinforcement learning: An evolutionary perspective." IEEE Transactions on Autonomous Mental Development 2.2, May 24, 2010, 13 pages.
Singh et al., "Where do rewards come from." Proceedings of the annual conference of the cognitive science society. Cognitive Science Society, 2009, 6 pages.
Stone et al., "Ad hoc autonomous agent teams: Collaboration without pre-coordination." Twenty-Fourth AAAI Conference on Artificial Intelligence, Jul. 5, 2010, 6 pages.
Stone et al., "Layered learning." European Conference on Machine Learning. Springer, Berlin, Heidelberg, May 31, 2000, 13 pages.
Sukhbaatar et al., "Learning multiagent communication with backpropagation." Advances in Neural Information Processing Systems, 2016, 9 pages.
Sutton et al., "Between MDPs and semi-MDPs: A framework for temporal abstraction in reinforcement learning." Artificial intelligence 112.1-2, Aug. 1, 1999, 31 pages.
Van Hoorn et al., "Hierarchical controller learning in a first-person shooter." 2009 IEEE symposium on computational intelligence and games. IEEE, Sep. 7, 2009, 8 pages.
Vezhnevets et al., "Feudal networks for hierarchical reinforcement learning." Proceedings of the 34th International Conference on Machine Learning—vol. 70. JMLR. org, Aug. 6, 2017, 12 pages.
Vlassis et al., "Learning model-free robot control by a Monte Carlo EM algorithm." Autonomous Robots 27.2, Aug. 1, 2009, 17 pages.
Weber et al., "Reinforced variational inference." Advances in Neural Information Processing Systems (NIPS) Workshops, 2015, 9 pages.
Wiltschko et al., "Mapping sub-second structure in mouse behavior." Neuron 88.6, Dec. 16, 2015, 29 pages.
Wolpert et al., "An introduction to collective intelligence." arXiv preprint cs/9908014, Aug. 17, 1999, 88 pages.
Wu et al., "Training agent for first-person shooter game with actor-critic curriculum learning.", 2016, 23 pages.
Youtube.com [online], "Human-Level in first person multiplayer games with population-based deep RL" Jul. 6, 2018, [retrieved on Aug. 22, 2019], retrieved from: URL <https://www.youtube.com/watch?v=dltN4MxV1Rlz>, 1 page.

\* cited by examiner

DEEP REINFORCEMENT LEARNING WITH FAST UPDATING RECURRENT NEURAL NETWORKS AND SLOW UPDATING RECURRENT NEURAL NETWORKS

CROSS-REFERENCE TO RELATED APPLICATION

This application claims priority to U.S. Provisional Application No. 62/677,632, filed on May 29, 2018. The disclosure of the prior application is considered part of and is incorporated by reference in the disclosure of this application.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a reinforcement learning system that selects actions to be performed by a reinforcement learning agent interacting with an environment.

Particular embodiments of the subject matter described in this specification can be implemented so as to realize one or more of the following advantages.

The aspects that relate to automatically identifying temporally extended behaviour patterns of an agent interacting with an environment can facilitate evaluation of the performance of an agent comprising a neural network system by analyzing the behavior of the agent. More particularly the described methods and systems are able to identify high-level patterns of behavior which might otherwise be masked by the complexity of the system. This in turn enables human evaluation of an agent in terms of these patterns, for example to determine how efficiently the agent is accomplishing its goal, and the techniques it is using. Thus the techniques can represent very complex internal states of the agent in an understandable manner, which assists in evaluation and hence implementation of control of a real-world or simulated system by an autonomous or semi-autonomous agent as previously described. For example the described methods and systems can help a human to understand how or why the agent is behaving as it is in controlling a system, and hence can assist in tailoring the agent to suit a particular task.

Certain described aspects relate to using a temporally hierarchical neural network system to select actions. These aspects allow actions that are selected at each time step to be consistent with long-term plans for the agent. The agent can then achieve improved performance on tasks that require that actions be selected that are dependent on data received in observations at time steps that are a large number of time steps before the current time step. Because the neural networks are trained jointly, the increase in performance can be achieved without an excessive increase in the amount of computing resources consumed during the training of the recurrent neural network. By using the temporally hierarchical neural network system to generate a latent variable and then conditioning an action selection on the latent variable, the system can effectively perform tasks even where received observations do not fully characterize the true state of the environment, i.e., where there is ambiguity as to the true state of the environment even given all of the observations received by the agent thus far. For example, many tasks include multiple agents operating independently in the environment, e.g., multiple autonomous vehicles or multiple robots. In these tasks, the observations received by a single agent do not fully characterize the true state of the environment because the agent does not know the control policies for the other agent or if those control policies change over time. Thus there is inherent uncertainty because the agent cannot know how the other agents will behave or react to changes in the environment state. The system can account for this uncertainty by using the temporally hierarchical neural network to sample latent variables from a posterior distribution that is dependent on both long-term and short-term data received from the environment.

Certain described aspects allow the system to learn a reward for the training of a neural network. These aspects allow the system to effectively train the neural network, i.e., to train the neural network so that it can be used to cause the agent to have acceptable performance on a reinforcement learning task, even in circumstances where rewards that are tied to task performance are very sparse and very delayed. In particular, the system can leverage additional information that can be extracted from the environment to generate an improved reward signal even when data specifying how the extracted information is relevant to task performance is not specified before training begins.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
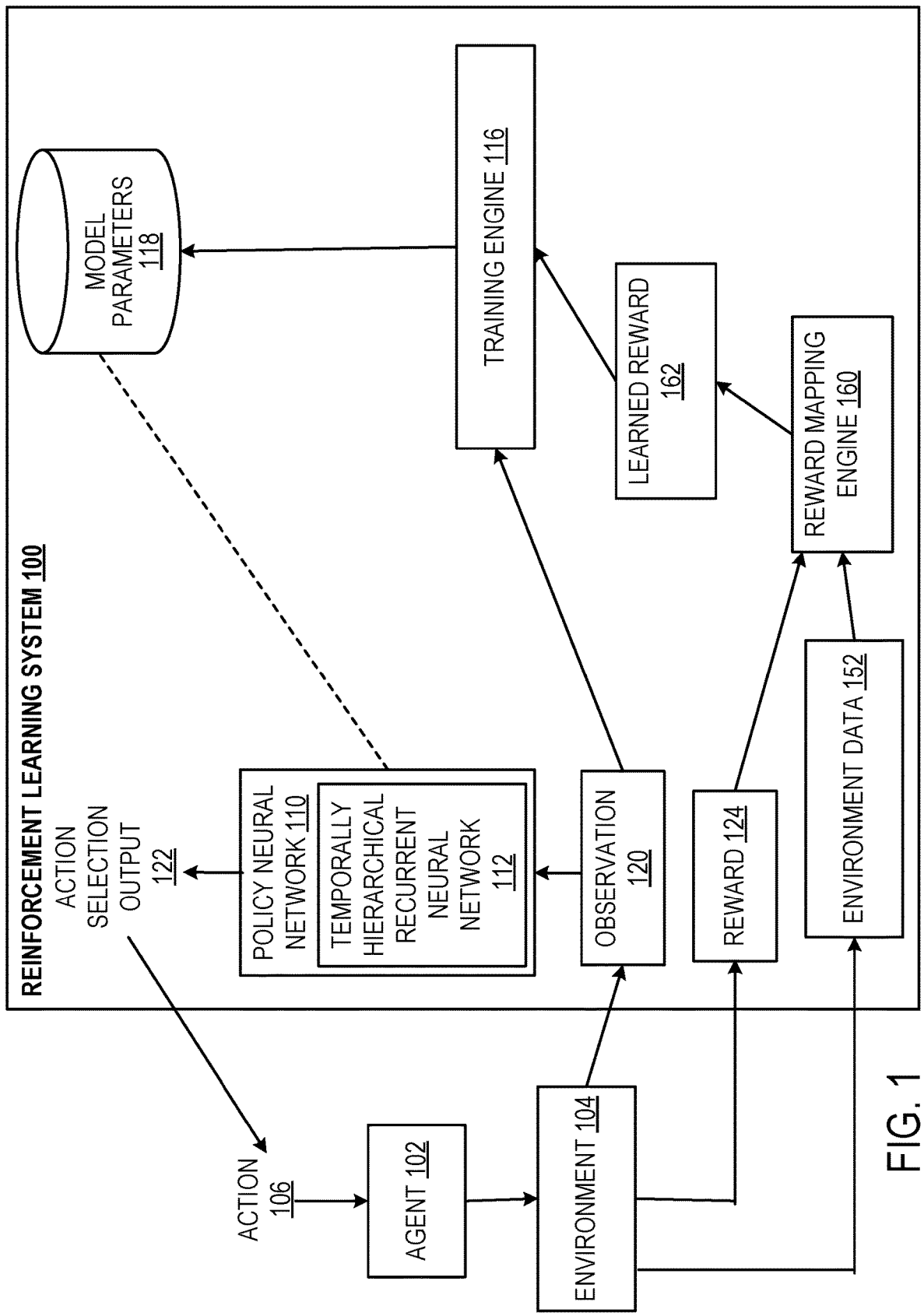
FIG. 1 shows an example reinforcement learning system.

This specification describes a reinforcement learning system that controls an agent interacting with an environment by, at each of multiple time steps, processing data characterizing the current state of the environment at the time step (i.e., an "observation") to select an action to be performed by the agent.

At each time step, the state of the environment at the time step depends on the state of the environment at the previous time step and the action performed by the agent at the previous time step.

In some implementations, the environment is a real-world environment and the agent is a mechanical agent interacting with the real-world environment, e.g., a robot or an autonomous or semi-autonomous land, air, or sea vehicle navigating through the environment. In particular, the environment may be a real-world environment in which multiple agents, i.e., multiple autonomous vehicles or multiple robots, are operating. In these cases, the control policies being used to control the other agents are generally not available to the system.

In these implementations, the observations may include, e.g., one or more of: images, object position data, and sensor data to capture observations as the agent interacts with the environment, for example sensor data from an image, distance, or position sensor or from an actuator.

For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control inputs to control the robot, e.g., torques for the joints of the robot or higher-level control commands, or the autonomous or semi-autonomous land, air, sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g. steering, and movement e.g., braking and/or acceleration of the vehicle.

In some other applications the agent may control actions in a real-world environment including items of equipment, for example in a data center, in a power/water distribution system, or in a manufacturing plant or service facility. The observations may then relate to operation of the plant or facility. For example the observations may include observations of power or water usage by equipment, or observations of power generation or distribution control, or observations of usage of a resource or of waste production. The actions may include actions controlling or imposing operating conditions on items of equipment of the plant/facility, and/or actions that result in changes to settings in the operation of the plant/facility e.g. to adjust or turn on/off components of the plant/facility.

In the case of an electronic agent the observations may include data from one or more sensors monitoring part of a plant or service facility such as current, voltage, power, temperature and other sensors and/or electronic signals representing the functioning of electronic and/or mechanical items of equipment.

FIG. 1 shows an example reinforcement learning system 100. The reinforcement learning system 100 is an example of a system implemented as computer programs on one or more computers in one or more locations in which the systems, components, and techniques described below are implemented.

The system 100 controls an agent 102 interacting with an environment 104 by selecting actions 106 to be performed by the agent 102 and then causing the agent 102 to perform the selected actions 106. This repeated performance of actions by the agent generally causes the state of the environment to repeatedly transition into new states.

The system 100 includes a policy neural network 110 and a training engine 116 and maintains a set of model parameters 118 of the policy neural network 110.

At each of multiple time steps, the policy neural network 110 is configured to process an input that includes a current observation 120 characterizing the current state of the environment 104 in accordance with the model parameters 118 to generate an action selection output 122 ("action selection policy").

The system 100 uses the action selection output 122 to select the action 106 to be performed by the agent at the current time step. A few examples of using the action selection output 122 to select the action 106 to be performed by the agent 102 are described next.

In one example, the action selection output 122 may define a probability distribution over actions in a set of possible actions that can be performed by the agent. For example, the action selection output 122 may include a respective numerical probability value for each action in a set of possible actions that can be performed by the agent. As another example, the action selection output 122 may include parameters of a distribution over the set of possible actions, e.g., parameters of a multi-variate Normal distribution over the set of actions when the set of actions is represented as a continuous space. The system 100 can select the action to be performed by the agent, e.g., by sampling an action in accordance with the probability values for the actions, or by selecting the action with the highest probability value.

In another example, the action selection output 122 may directly define the action to be performed by the agent, e.g., by defining the values of torques that should be applied to the joints of a robotic agent.

In another example, the action selection output 122 may include a respective Q-value for each action in the set of possible actions that can be performed by the agent. The system 100 can process the Q-values (e.g., using a soft-max function) to generate a respective probability value for each possible action, which can be used to select the action to be performed by the agent (as described earlier). The system 100 could also select the action with the highest Q-value as the action to be performed by the agent.

The Q value for an action is an estimate of a "return" that would result from the agent performing the action in response to the current observation 120 and thereafter selecting future actions performed by the agent 102 in accordance with current values of the policy neural network parameters.

A return refers to a cumulative measure of "rewards" 124 received by the agent, for example, a time-discounted sum of rewards. The agent can receive a respective reward 124 at each time step, where the reward 124 is specified by a scalar numerical value and characterizes, e.g., a progress of the agent towards completing an assigned task.

In some cases, the system 100 can select the action to be performed by the agent in accordance with an exploration policy. For example, the exploration policy may be an $\epsilon$-greedy exploration policy, where the system 100 selects the action to be performed by the agent in accordance with the action selection output 122 with probability 1-$\epsilon$, and randomly selects the action with probability $\epsilon$. In this example, $\epsilon$ is a scalar value between 0 and 1. As another example, the system can add randomly sampled noise to the action selection output 122 to generate a noisy output and then select the action using the noisy output instead of the output 122.

The policy neural network 110 includes a temporally hierarchical recurrent neural network 112. The temporally hierarchical recurrent neural network 112, in turn, includes two recurrent neural networks: a fast updating recurrent neural network (RNN) that updates its hidden state at every time step and a slow updating recurrent neural network that updates its hidden state at less than all of the time steps.

The hidden state of the fast updating recurrent neural network will be referred to in this specification as a "fast updating hidden state" and the hidden state of the slow updating recurrent neural network will be referred to in this specification as a "slow updating hidden state."

As will be described in more detail below, the fast updating RNN is referred to as "fast updating" because the fast updating hidden state is updated at every time step. By contrast, the slow updating RNN is referred to as "slow updating" because the slow updating hidden state is not updated at every time step and is instead only updated when certain criteria are satisfied.

At each time step, the fast updating recurrent neural network receives an input that includes the observation 120 and the slow updating hidden state of the slow updating recurrent neural network and uses the input to update the fast updating hidden state.

The policy neural network 110 then uses this updated fast updating hidden state to generate the action selection output 122. By making use of the temporally hierarchical RNN 112, the system 100 can select actions at each time step that are consistent with long-term plans for the agent and the system 100 can effectively control the agent even on tasks that can require that the action that us selected at any given time step be dependent on data received in observations at time steps that are a large number of time steps before the given time step.

The operation and the architectures of the policy neural network 110 and the temporally hierarchical recurrent neural network 112 are described in more detail below with reference to FIGS. 2-4.

The training engine 116 is configured to train the policy neural network 110 by repeatedly updating the model parameters 118 of the policy neural network 110 based on the interactions of the agent with the environment, i.e., using observations 120 and rewards 124 received as a result of the interaction of the agent with the environment.

The training engine 116 can train the policy neural network 110 to increase the return (i.e., cumulative measure of reward) received by the agent using reinforcement learning techniques using data collected from interactions of the agent with the environment. Because rewards measure progress of the agent in completing a task, training the policy neural network 110 to increase returns results in the agent being able to successfully complete specified tasks while being controlled by the policy neural network 110.

For some tasks, however, the external reward 124 may not be sufficient to generate a high quality learning signal that allows the training engine 116 to train the policy neural network 110 to have high performance on the task. For example, rewards 124 may be very sparse and very delayed. That is, even if a given action performed at a given time step contributed to the successful completion of the task a corresponding reward may not be received for many time steps after the given time step.

As a particular example, some tasks may require a large number of actions to be performed in order to be successfully completed. However, the reward 124 may be non-zero only once the task reaches a terminal state, e.g., may only be a positive value when the environment reaches the final state in which the task is complete. This may make it difficult to train the policy neural network 110 using only the sparse reward 124 as the learning signal.

In these cases, the system 100 can leverage additional data 152 that can be extracted from the environment to generate an improved reward signal even when data specifying how the extracted data 152 is relevant to task performance is not specified before training begins. In particular, a reward mapping engine 160 can, at each time step, map the additional data 152 (and optionally the reward 124 if non-zero) to a learned reward value 162 and this learned reward 162 can be used by the training engine 116 to update the model parameters 118 (i.e., instead of relying only on the sparse reward 124). Learned rewards are described in more detail below with reference to FIGS. 2 and 5.

Additionally, the system 100 can generate and provide for presentation to users data identifying temporally extended behavior patterns of the agent interacting with an environment. That is, the system 100 can generate user interface data and provide the user interface data to users for presentation on user devices. This can facilitate evaluation of the performance of the agent by allowing users to analyze the behavior of the agent while being controlled by the policy neural network. Generating such user interface data is described below with reference to FIGS. 6 and 7.

Figure 2:
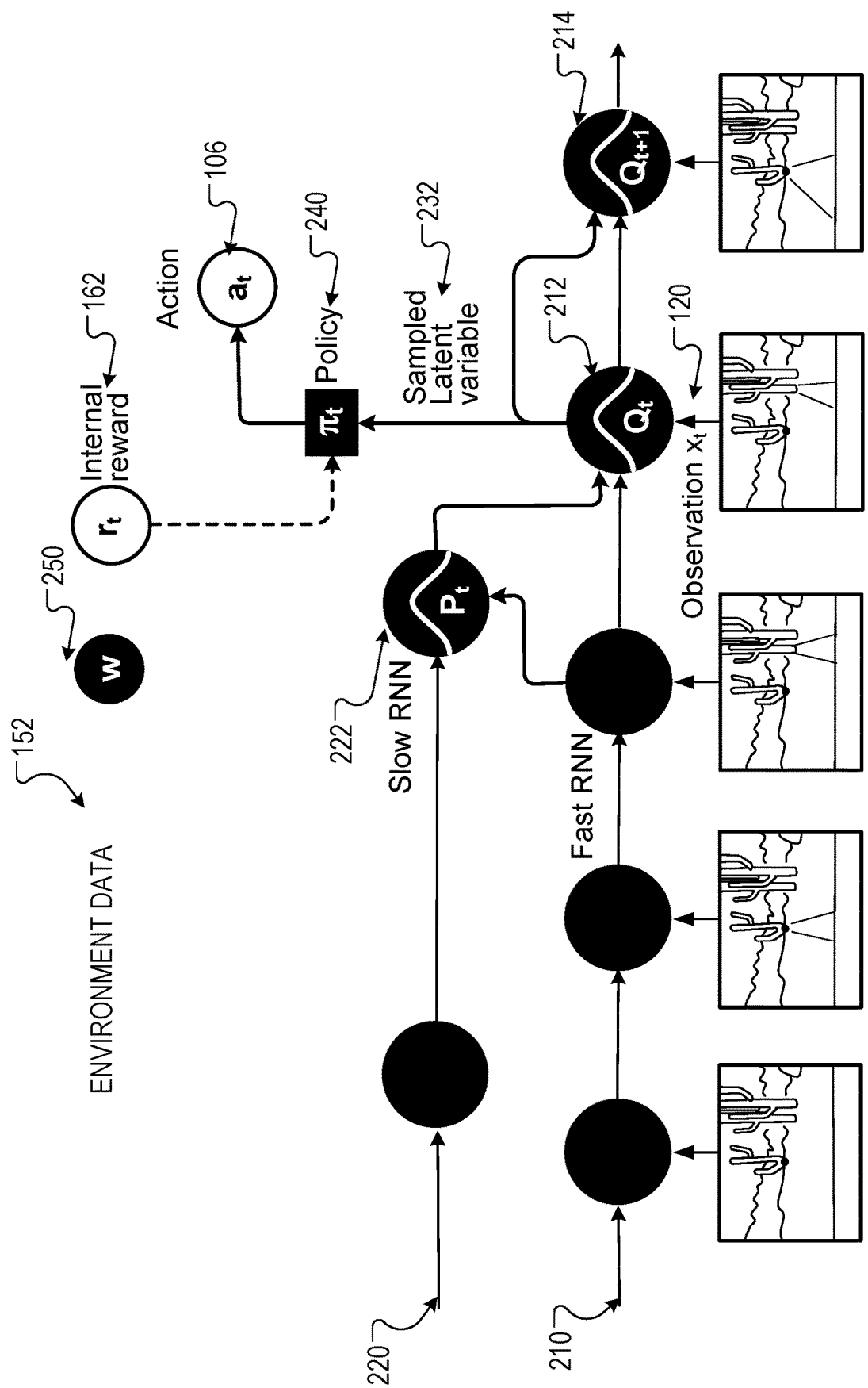
FIG. 2 shows the processing performed by the reinforcement learning system at a given time step.

FIG. 2 shows the operation of the reinforcement learning system at a time step t during the interaction of the agent with the environment.

In the example of FIG. 2, the observation 120 that is received at time step t is an image of the environment, e.g., as captured by a camera sensor of the agent, at the time step t. As described above, however, the observations can include other data characterizing the state of the environment in addition to or instead of an image.

The example of FIG. 2 shows how the fast updating hidden state 210 and the slow updating hidden state 220 are updated across a sequence of time steps that includes the time step t. As can be seen in the example of FIG. 2, the fast updating RNN updates the fast updating hidden state at each time step using an input that includes the observation at the time step. The slow updating RNN, on the other hand, does not update the slow updating hidden state at each time step. In FIG. 2, time steps at which a hidden state is updated are those at which an arrow representing the hidden state connects to a black circle and time steps at which a hidden state is not updated are those at which there is no black circle. For example, there is no update to the state of the slow updating RNN at the time step that precedes the time step t in the sequence.

At any given time step, if criteria are satisfied for updating the slow updating hidden state, the system processes a slow updating input that includes the fast updating hidden state, i.e., the final fast updating hidden state after the time step before the given time step, using the slow updating RNN to update the slow updating hidden state. Thus, at time step t the input to the slow updating RNN can be the fast updating hidden state after time step t−1 and the slow updating RNN can use the input to update the slow updating hidden state for time step t.

The slow updating RNN can have any appropriate recurrent architecture. For example, the slow updating RNN can be a stack of one or more long short-term memory (LSTM) layers. When there is more than one layer in the stack, the slow updating hidden state can be the hidden state of the last LSTM layer in the stack.

When the criteria are not satisfied, the system refrains from updating the slow updating hidden state at that time step, i.e., does not update the slow updating hidden state before the slow updating hidden state is used for further processing at the time step.

At each time step, the system generates, from the slow updating hidden state, parameters of a prior distribution 222 over possible values of a latent variable, e.g., by applying a linear transformation to the slow updating hidden state. Generally, the latent variable is a vector of fixed dimensionality and the prior distribution is therefore a multivariate distribution over possible values for the latent variable. For example, the prior distribution can be a Normal distribution and the parameters can therefore be the mean and covariances of a multivariate Normal distribution. When the slow updating hidden state was not updated at a given time step, the system can re-use the most recently computed prior parameters rather than having to re-compute the prior parameters from the same hidden state as in the preceding time step.

The system then processes a fast updating input that includes the observation 120, the slow updating hidden state, and the parameters of the prior distribution 222 using the fast updating RNN to update the fast updating hidden state.

Like the slow updating RNN, the fast updating RNN can have any appropriate recurrent architecture. For example, the fast updating RNN can be a stack of one or more long short-term memory (LSTM) layers. When there is more than one layer in the stack, the fast updating hidden state can be the hidden state of the last LSTM layer in the stack.

When the observation is an image (like in the example of FIG. 2) or other high-dimensional data, the fast updating RNN can include, before the recurrent layers, the layers of a convolutional neural network (CNN) or other encoder neural network that encodes the observation prior to an encoded representation of the observation being processed through the recurrent layers of the fast updating RNN.

Additionally, in some implementations, the fast updating RNN and the slow updating RNN are augmented with a shared external memory, i.e., both of the RNNs read to and write from the same, shared external memory as part of updating the corresponding hidden state. An example architecture for augmenting an RNN with an external memory that can be used by the system is the Differentiable Neural Computer (DNC) memory architecture, which is described in more detail in Alex Graves, Greg Wayne, Malcolm Reynolds, Tim Harley, Ivo Danihelka, Agnieszka Grabska-Barwinska, Sergio Gomez Colmenarejo, Edward Grefenstette, Tiago Ramalho, John Agapiou, et al. Hybrid computing using a neural network with dynamic external memory. Nature, 538(7626):471, 2016.

Once the fast updating hidden state has been updated at the time step t, the system uses the fast updating hidden state to generate parameters of a posterior distribution 212 over possible values for the latent variable, e.g., by applying a linear transformation to the slow updating hidden state.

The system then samples a latent variable 232 from the posterior distribution 212, i.e., samples one of the possible values for the latent variable in accordance with the probabilities in the posterior distribution 212.

The system then uses the sampled latent variable 232 to select the action 106 to be performed in response to the observation 120.

In particular, the system processes the sampled latent variable using one or more policy neural network layers to generate the policy output (i.e., the action selection output 122) and then selects the action 106 using the policy output.

The fast updating input that is processed by the fast updating RNN at any given time step can also include additional inputs (other than the observation, the slow updating hidden state, and the prior parameters). For example, the fast updating hidden state $h_t^q$ at time step t can satisfy:

$$h_t^q = g_q(u_t, a_{t-1}, r_{t-1}, h_t^p, h_{t-1}^q, \mu_t^p, \Sigma_t^p, z_{t-1}),$$

where $g_q$ represents the operations performed by the fast updating RNN, $u_t$ is the encoded representation of the observation $x_t$ at the time step t, $a_{t-1}$ is the action performed at the preceding time step, $r_{t-1}$ is the reward (external or learned) from the preceding time step, $h_t^p$ is the slow updating hidden state at time t, $h_{t-1}^q$ is the preceding fast updating hidden state, $\mu_t^p$ and $\Sigma_t^p$ are the mean and covariances of the prior distribution generated using the slow updating hidden state, and $z_{t-1}$ is the latent variable sampled at the preceding time step.

By sampling a latent variable from a distribution rather than directly using the fast updating hidden state to the select the action, the system can effectively account for uncertainty in cases where received observations do not fully characterize the true state of the environment, i.e., where there is ambiguity as to the true state even given all of the observations received by the agent thus far.

When the time step t occurs during learning (or when the time step t occurs after learning but rewards are part of the input to the fast updating RNN) and the system is using a learned reward to augment the external reward, the system also receives the data 152 that is extracted from the environment and applies the current reward mapping to the environment data 152 to generate the learned (or "internal") reward 162. This learned reward can then be used to update the policy neural network 110. Applying the mapping and updating the mapping data will be described in more detail below.

In particular, the system can train the neural network 110 to maximize received returns using reinforcement learning.

As a particular example, in some cases the neural network 110 also generates, from the sampled latent variable, a value output (also referred to as a "baseline output" below) that is an estimate of a return resulting from the environment being in the current state. In these cases, the system can train the neural network 110 using an actor-critic reinforcement learning technique.

During the training, the system uses the prior distribution generated using the prior parameters to regularize the latent variable. This helps ensure that the slow and fast updating RNNs capture long-range temporal correlations and promotes memory of information received in observations. In particular, during the training, the system augments the reinforcement learning technique by training the fast and slow updating recurrent neural networks to minimize a divergence, e.g., a KL divergence, between the prior distribution and the posterior distribution. In some cases, to prevent the two distributions from matching, the system also includes a term in the loss function in the training that penalizes a KL divergence between the prior distribution and a multivariate Gaussian with mean 0, standard deviation 0.1 or some other small fixed value.

As will be described in more detail below, during training the system can also generate a respective auxiliary output for each of one or more auxiliary tasks using the hidden state of the fast updating recurrent neural network and train the neural network on the auxiliary task based on the auxiliary output for the auxiliary task.

Figure 3A:
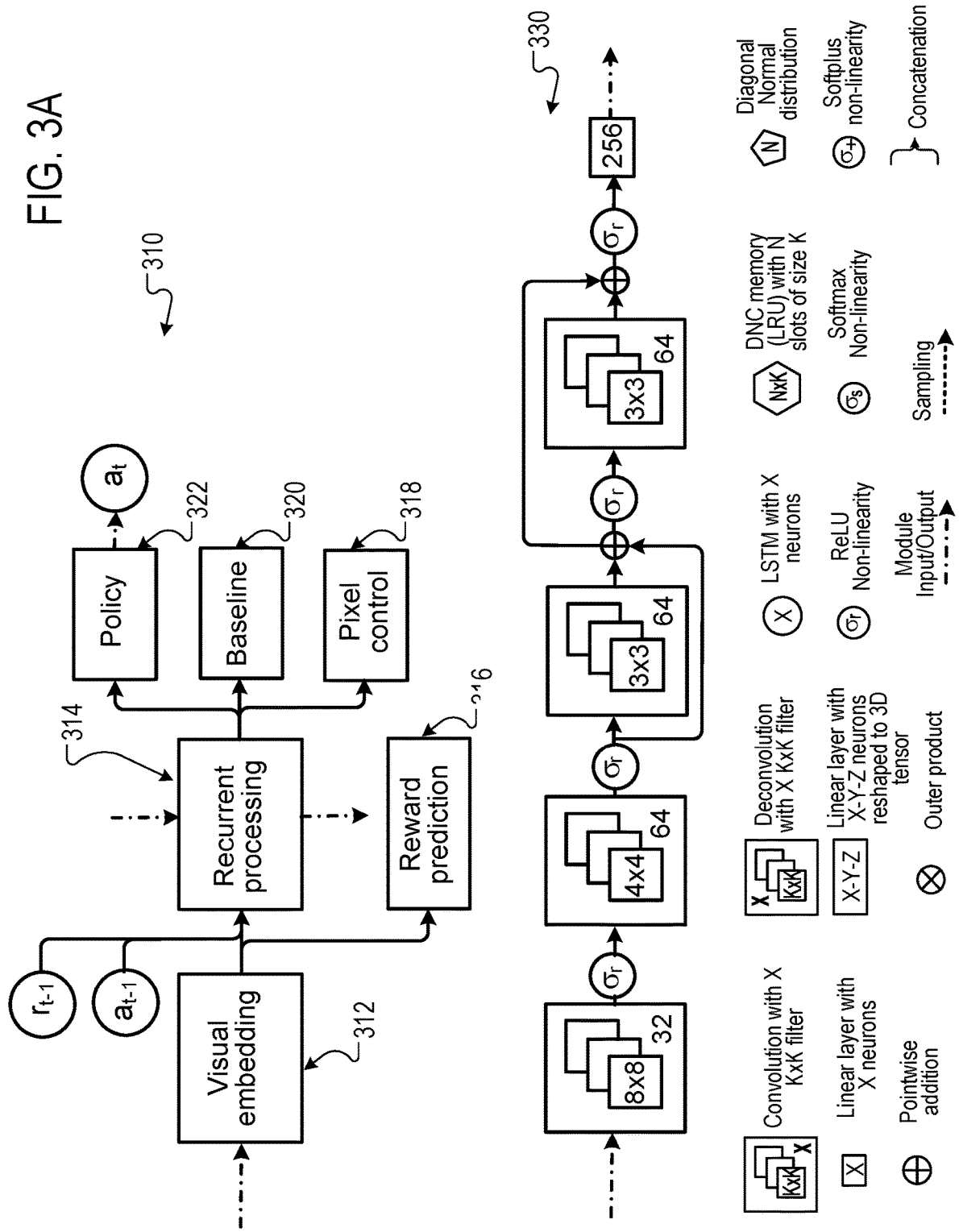
FIGS. 3A and 3B show example architectures of the neural networks used by the reinforcement learning system.
Figure 3B:
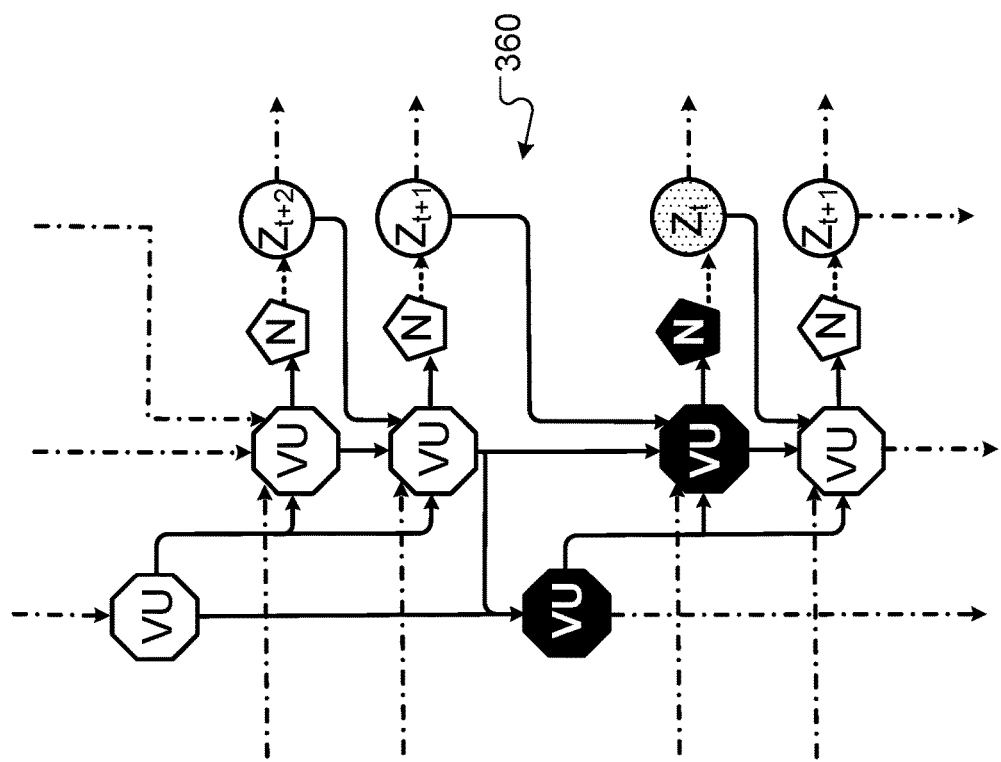
Figure 3B:
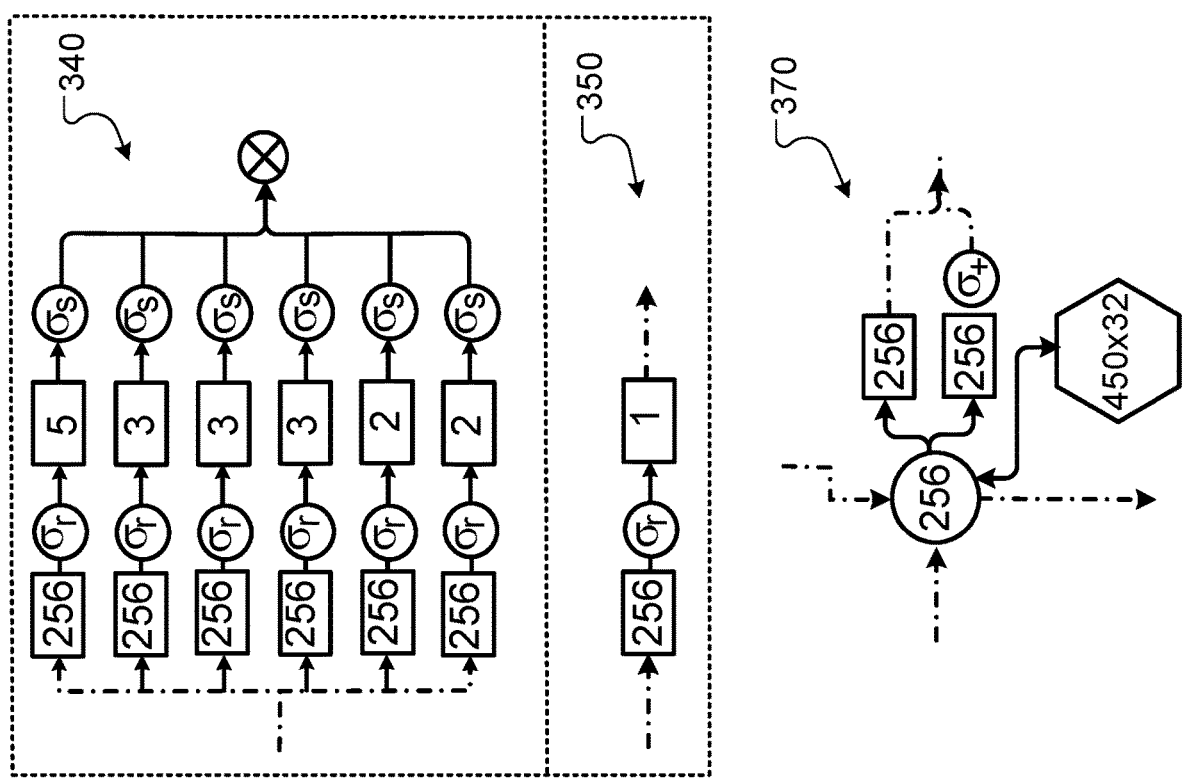

FIGS. 3A and 3B are diagrams that show example architectures for the various components of the policy neural network 110. The legend shown in FIG. 3A that identifies the various neural network components represented by the symbols in the diagrams is also applicable to the diagrams in FIG. 3B.

FIG. 3A shows an example of a high-level architecture 310 of the policy neural network 110. In particular, the architecture shows a visual embedding (convolutional) neural network 312 that processes the input observation to generate an encoded representation and a recurrent processing block 314 that includes the slow-updating and fast-updating RNNs that generate the latent variable.

The architecture 310 also shows the policy neural network layers 322 that generate the action selection output conditioned on the latent variable, baseline neural network layers 320 that generate, using the latent variable, a baseline score that is used in training the policy neural network when trained using a reinforcement learning technique that requires baseline state value scores, e.g., an actor-critic based technique like the Importance Weighted Actor-Learner (IMPALA) technique described in IMPALA: Scalable Distributed Deep-RL with Importance Weighted Actor-Learner Architectures, Lasse Espeholt, Hubert Soyer, Remi Munos, Karen Simonyan, Volodymir Mnih, Tom Ward, Yotam Doron, Vlad Firoiu, Tim Harley, Iain Dunning, Shane Legg, Koray Kavukcuoglu. As described above, the system can augment this training by adding additional loss terms that regularize the latent variable using the prior distribution.

The architecture 310 also includes multiple auxiliary components that can be used to improve the training of the policy neural network, e.g., a reward prediction neural network 316 that attempts to predict the next reward that will be received and a pixel control neural network 318 that predicts how much the pixels of the current observation will change in the next observation. These neural networks can be trained jointly with the remainder of the policy neural network and gradients can be backpropagated into the policy neural network from these neural networks to improve the representations learned by the policy neural network during training.

FIG. 3A also shows a detailed architecture 330 of the visual embedding neural network that receives the observation and generates the encoded representation that is provided as part of the input to the recurrent processing blocks 314.

FIG. 3B shows a detailed architecture 340 of the policy neural network, a detailed architecture of the baseline neural network 350, and a detailed architecture of the recurrent processing block 360 which includes a variational unit (VU) that is described in more detail in the detailed VU architecture 370.

Figure 4:
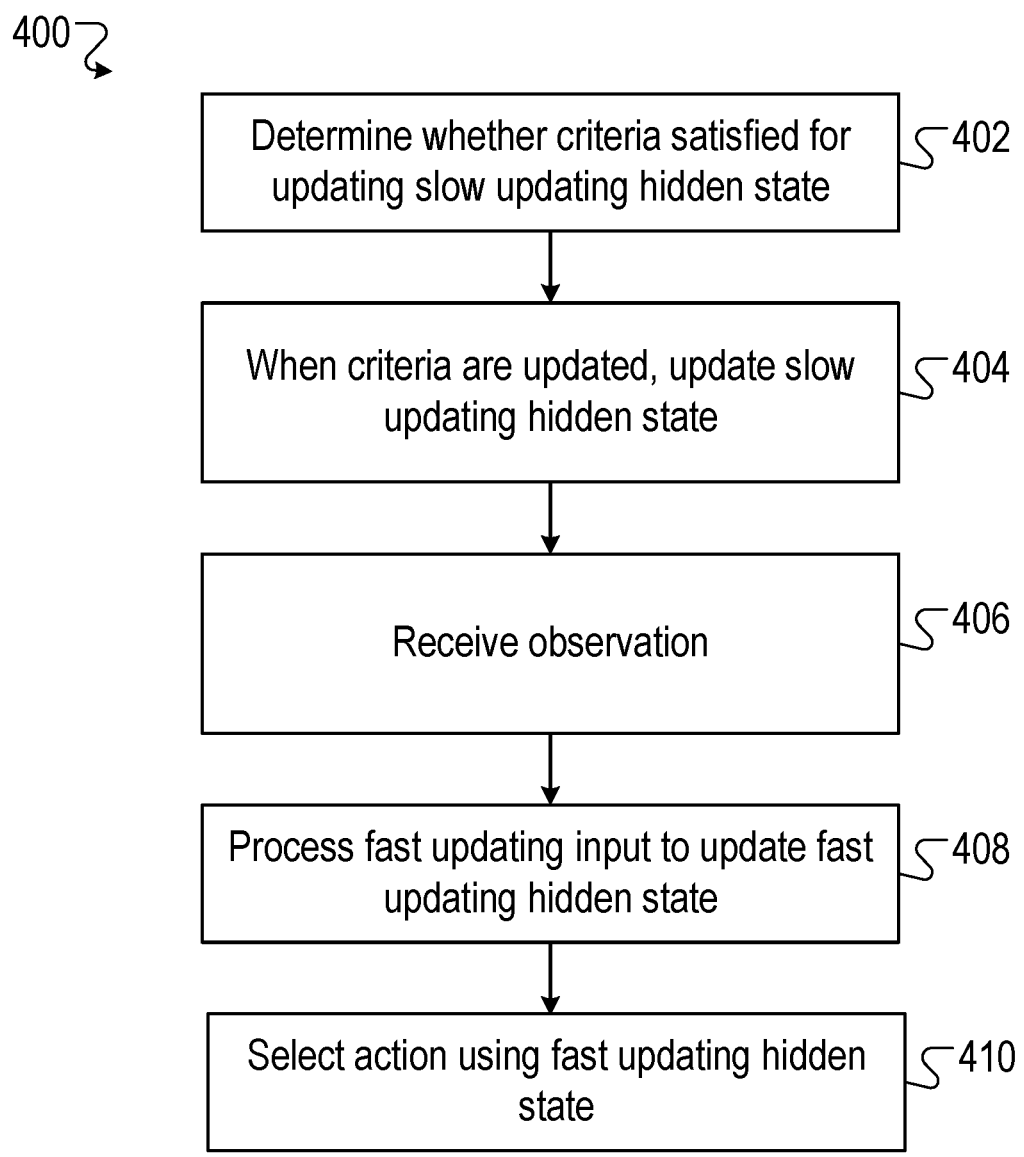
FIG. 4 is a flow diagram of an example process for selecting an action to be performed by the agent.

FIG. 4 is a flow diagram of an example process 400 for selecting an action to be performed by the agent. For convenience, the process 400 will be described as being performed by a system of one or more computers located in one or more locations. For example, a reinforcement learning system, e.g., the reinforcement learning system 100 of FIG. 1, appropriately programmed, can perform the process 400.

The system determines whether criteria are satisfied for updating the slow updating hidden state (step 402). As described above, the criteria are generally satisfied at less than all of the time steps.

For example, the criteria may be satisfied only at predetermined intervals during interaction of the agent with the environment. That is, the criteria can be satisfied at every N time steps, where N is an integer greater than one. For example, N can be an integer in the range of five to twenty, inclusive.

As another example, the system can, at each time step, determine a difference measure between the observation at the time step and the observation at the last time step at which the hidden state of the slow updating recurrent neural network was updated. In this example, the criteria are satisfied at a given time step only when the difference measure satisfies a threshold, i.e., when the observation is sufficiently different from the observation at the last time step at which the hidden state was updated. For example, the distance measure can be a cosine similarity between the encoded representations generated by the encoder neural network and the criteria can be satisfied only when the cosine similarity is below a threshold similarity.

When the criteria are satisfied, the system updates the slow updating hidden state as described above (step 404). When the criteria are not satisfied, the system refrains from updating the slow updating hidden state.

The system receives the observation at the time step (step 406).

The system processes a fast updating input to update the fast updating hidden state as described above (step 408).

The system selects the action using the fast updating hidden state (step 410). For example, the system can use the fast updating hidden state to sample a latent variable as described above and then process the sampled latent variable using one or more policy neural network layers to generate a policy output.

As described above, in some implementations, the system augments the training of the neural network by using learned reward values instead of or in addition to actual external reward values received from the environment.

In particular, the system uses a reward mapping that maps the data extracted from the environment to a reward value. Generally, the extracted data includes a respective numeric value for each of one or more reward signals that can be directly observed from the environment, e.g., are directly measured by the sensors of the agent, can be determined from the sensor measurements of the agent, or can be determined from other information about the environment and the agent that the system has access to. As a particular example, one or more of the reward signals can identify a location of the agent in the environment. As another particular example, one or more of the reward signals can identify a distance of the agent relative to a known object or a location in the environment. As yet another example, one or more of the reward signals can be the external rewards received from the environment, e.g., rewards that indicate that the task has been successfully completed, or unsuccessfully terminated.

So that the reward signals can be mapped to a reward value, the reward mapping data identifies, for each of the reward signals, a partitioning of possible numeric values for the reward signal into multiple partitions and then maps each partition to a corresponding reward value for the reward signal. Thus, for a given reward signal, the data maps different partitions to different reward values.

When there is more than one reward signal extracted from the environment at a given time step, the system can combine, e.g., average or sum, the reward values for the reward signals to generate the final reward value.

In implementations where the system learns this reward mapping, the system can maintain multiple candidate neural networks during the training and can use the set of multiple candidates to jointly update the parameter values and to learn the reward mapping.

In particular, during the training the system can maintain, for each of these candidate neural networks, data identifying parameter values for the candidate neural network and data identifying the reward mapping used during the training of the candidate neural network.

During the training, the system repeatedly updates the parameter values and reward mappings used by the candidate neural networks by performing the training operations described below with reference to FIG. 5 in parallel for each of the candidate neural networks.

Once the training has ended, i.e., after the training operations have repeatedly been performed, the system selects the trained values of the network parameters from the parameter values in the maintained data for the candidate neural networks. For example, the system can select the maintained parameter values of the candidate neural network that has the best performance on the reinforcement learning task after the training operations have repeatedly been performed. Thus, the system can continuously improve the reward mappings used by the candidate neural networks in order to augment the training process and to generate a higher quality trained neural network than could have been achieved using only external rewards.

Figure 5:
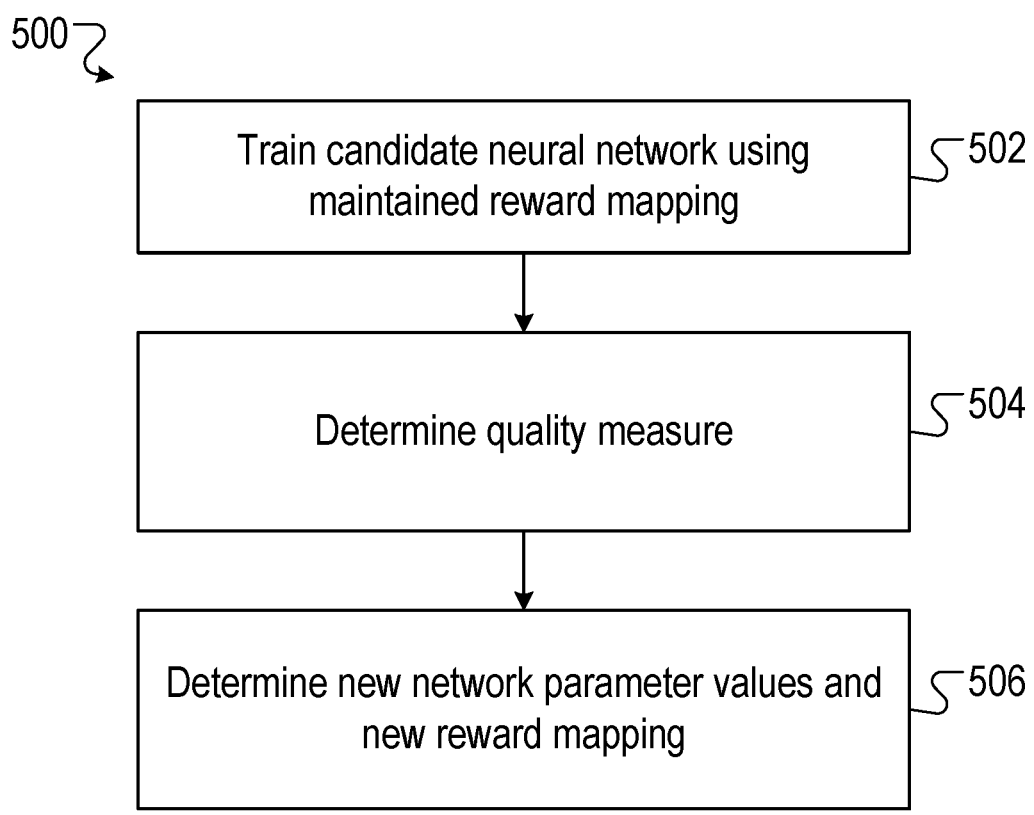
FIG. 5 is a flow diagram of an example process for updating the parameter values and the reward mapping of a candidate neural network.

FIG. 5 is a flow diagram of an example process 500 for updating the parameter values and the reward mapping of a candidate neural network. For convenience, the process 500 will be described as being performed by a system of one or more computers located in one or more locations. For example, a reinforcement learning system, e.g., the reinforcement learning system 100 of FIG. 1, appropriately programmed, can perform the process 500.

The system can repeatedly perform the process 500 in parallel for all of the candidate neural networks in the set. In some cases, the system performs the process 500 asynchronously for all of the candidate neural networks.

The system trains the candidate neural network using the maintained reward mapping for the candidate neural network (step 502). That is, the system trains the candidate neural network using a reinforcement learning technique, e.g., the technique described above, on interactions of the agent with the environment to update the values of the parameters of the candidate neural networks. During the training, the system uses data extracted from the environment and the reward mapping for the candidate neural network to generate the rewards that are being used in the training.

For example, the system can train the candidate neural network for a predetermined number of time steps or for a predetermined number of task episodes or for a predetermined amount of time in order to complete step 502.

The system determines a quality measure for the trained candidate neural network that represents how well the candidate neural network can control the agent to perform the task (relative to the other candidate neural networks) (step 504). An example of a quality measure can be a fraction of task episodes that are completed successfully when the agent is controlled by the trained candidate neural network. In some cases, the system does not use the external reward as part of the reward mapping and can instead use, as the quality measure, the average external reward that is received when the agent is controlled using the candidate neural network.

The system determines new network parameter values and a new reward mapping for the candidate neural network using the quality measure (step 506).

Generally, the system can update the new network parameter values, the new reward mapping, and optionally, other hyperparameters of the training (e.g., the interval N described above), so that weaker performing neural networks copy the parameters of stronger neural networks while exploring the space of possible reward mappings and optionally other hyperparameters.

For example, the system can sample another candidate from the set and compare the quality measures of the two candidates.

If the quality measure of one candidate was found to be more than a threshold amount worse than the other candidate, the system can copy, for the worst performing candidate, the parameters, the reward mapping, and hyperparameters of the better candidate. The system can then explore new reward mappings and hyperparameters for the worse performing candidate. For example, the system can determine, for each reward signal partition, whether to modify the reward value to which the partition is mapped with a predetermined probability and in response to determining to modify the reward value to which the partition is mapped, changing the numeric value to which the partition is mapped, e.g., randomly perturbing the numeric value in either direction by some fixed fraction of the current value.

As another example, the system can sample one or more other candidate neural networks and determine whether the quality measure indicates that the candidate neural network performs better than all of the one or more other candidate neural networks.

In response to determining that the candidate neural network does not perform better than all of the one or more other candidate neural networks, the system (1) sets the new values of the network parameters to the maintained values of the network parameters for the best performing sampled other candidate neural network and (2) sets the new reward mapping to a modified version of the maintained reward mapping for the best performing other candidate neural network. For example, the system can generate the modified version by, for each reward signal partition, determining whether to modify the reward value to which the partition is mapped with a predetermined probability and in response to determining to modify the reward value to which the partition is mapped, changing the numeric value to which the partition is mapped, e.g., randomly perturbing the numeric value in either direction by some fixed fraction of the current value.

In response to determining that the candidate neural network does perform better than all of the one or more other candidate neural networks, the system sets the new values of the network parameters to the updated values of the network parameters after the training in step 502 and does not modify the reward mapping.

Thus, by repeatedly performing the process 500 for all of the candidate neural networks the system trains the neural network while exploring the space of possible reward mappings to discover reward mappings that result in better agent performance on the task.

As described above, in some implementations, the system can provide certain data derived from the interactions of the agent with the environment to a user for presentation. Thus, the system can automatically identify temporally extended behaviour patterns of an agent interacting with an environment and provide data identifying these patterns as output to a user device.

In some implementations, to discover these patterns, the system can allow the agent to interact with the environment and then determine a plurality of temporal sequences of features characterizing the state of the environment as the agent interacts with the environment.

The system can then train a variational autoencoder, in particular a variational sequence autoencoder, with the captured temporal sequences. The variational sequence autoencoder may include a recurrent neural network encoder to encode an input data sequence as a set of latent variables, coupled to a recurrent neural network decoder to decode the set of latent variables to produce an output data sequence, i.e., to reproduce the output data sequence from the input data sequence. During training the latent variables are constrained to approximate a defined distribution, for example a Gaussian distribution.

In some implementations the system also captures a further sequence of observations of the environment as the agent interacts with the environment. The system can then process the further sequence of observations using the trained variational sequence autoencoder to determine a sequence of sets of latent variables. Optionally, the system can process the sequence of sets of latent variables to identify a sequence of clusters in a space of the latent variables, each of the clusters representing a temporally extending behaviour pattern of the agent.

Thus the system can automatically identify and present to a user data identifying complex, high-level behaviors of the agent. In implementations the method represents these behaviors in a way which is comprehensible to a human, as described further below. For example, the clusters identified by the system may correspond to high-level behavior patterns which are easier for a human to recognize than the individual actions which make them up.

The features characterizing the state of the environment that are used to identify behaviors may be agent-centric features, that is features which are relevant to the high-level behaviors performed by the agent and represented by the clusters. Thus the features can include, e.g., features characterizing a position or state of the agent in relation to the environment. For example they may be features defined in relation the agent, such as a position or orientation of the agent or part of the agent, or a property of the agent, or a state of the agent or environment relevant to a short or long term reward for the agent.

In some implementations the features may be defined by hand and provided as an input to the method. The features may be high-level features in the sense that they may be defined as macroscopic properties of the agent-environment system, in particular at a high enough level to be interpretable to a human in the context of the task. For example the features may be relevant at a high level to the definition or achievement of a goal and/or the features may be expected to be meaningful components of some behavior patterns. The features may be captured directly from the environment by observations which are separate from the agent's observations, for example where properties of the environment are directly accessible as they may be in a simulated environment, and/or they may be derived from the agent's observations, and/or they may be learnt.

The variational sequence autoencoder processes sequences of the features over a timescale appropriate to the expected behaviour patterns. For example if a behaviour is expected to be characterizable over a timescale of one to a few seconds then the captured temporal sequences used to train the variational sequence autoencoder may have a similar timescale. The variational sequence autoencoder learns to encode, or compress a sequence of features into a set of latent variables which represents the sequence. The latent variables may be constrained to have a Gaussian distribution; they may comprise mean and standard deviation vectors. The recurrent neural network encoder and decoder may each comprise an LSTM (long short term memory) neural network.

Thus a set of latent variables of the variational sequence autoencoder may provide a latent representation of a sequence of observations in terms of the high level features. A sequence of sets of latent variables derived from the further observations may be processed using a mixture model to identify clusters. For example each of the sets of latent variables may be mapped to one of K components or clusters using the mixture model, which may be a Gaussian mixture model. Each component or cluster may correspond to a different temporally extending behavior derived from features representing high-level characteristics of the agent-environment system. These may be considered as prototypical behaviors for the agent, each extending over the timeframe of the sequences used to train the autoencoder.

Processing the further sequence of observations thus ultimately results in determining which of a set of prototypical behaviors the agent is involved in at each of a succession of times.

Optionally these behaviors, more particularly the clusters, may be represented, for example graphically, in combination with a corresponding representation of the agent and/or the environment for some or all of the clusters. The representation of the clusters may be, e.g., a chart with a time on one axis and identified behavior patterns on the same or another axis. The representation of the agent and/or environment may be in any convenient form, for example an image and/or set of features. There may be an association between a cluster and the corresponding state, for example representing these in conjunction with one another, or providing a representation of the state with a mouse hover over a representation of a cluster.

Figure 6:
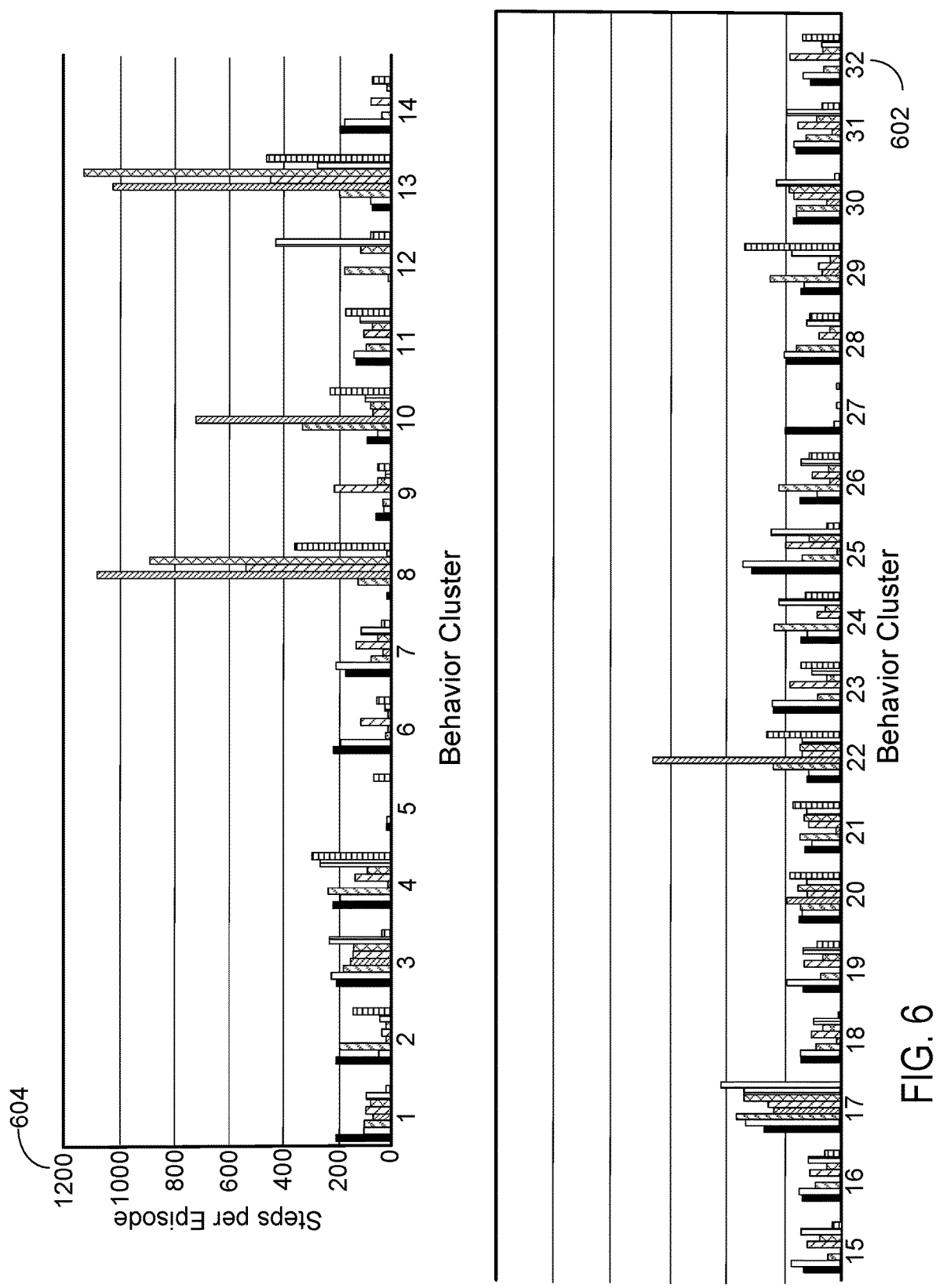
FIG. 6 shows an example of a user interface presentation of agent behavior.

FIG. 6 shows an example of a user interface presentation 600 of agent behavior. In particular, the user interface presentation 600 shows behaviors that have been discovered using the techniques described above. In particular, the presentation 600 shows clusters of behaviors along the axis 702 and the number of steps during an episode that the behavior was engaged in along the axis 704. Thus, the height of the bar in the presentation 600 that represents a given behavior represents how frequently the agent was performing the behavior during the episode. The system can allow the user to access more information about the behavior, e.g., a representation of the state that the environment was in when the agent was engaging in the behavior, by mousing over, selecting, or otherwise interacting with the bars in the presentation 600.

Figure 7:
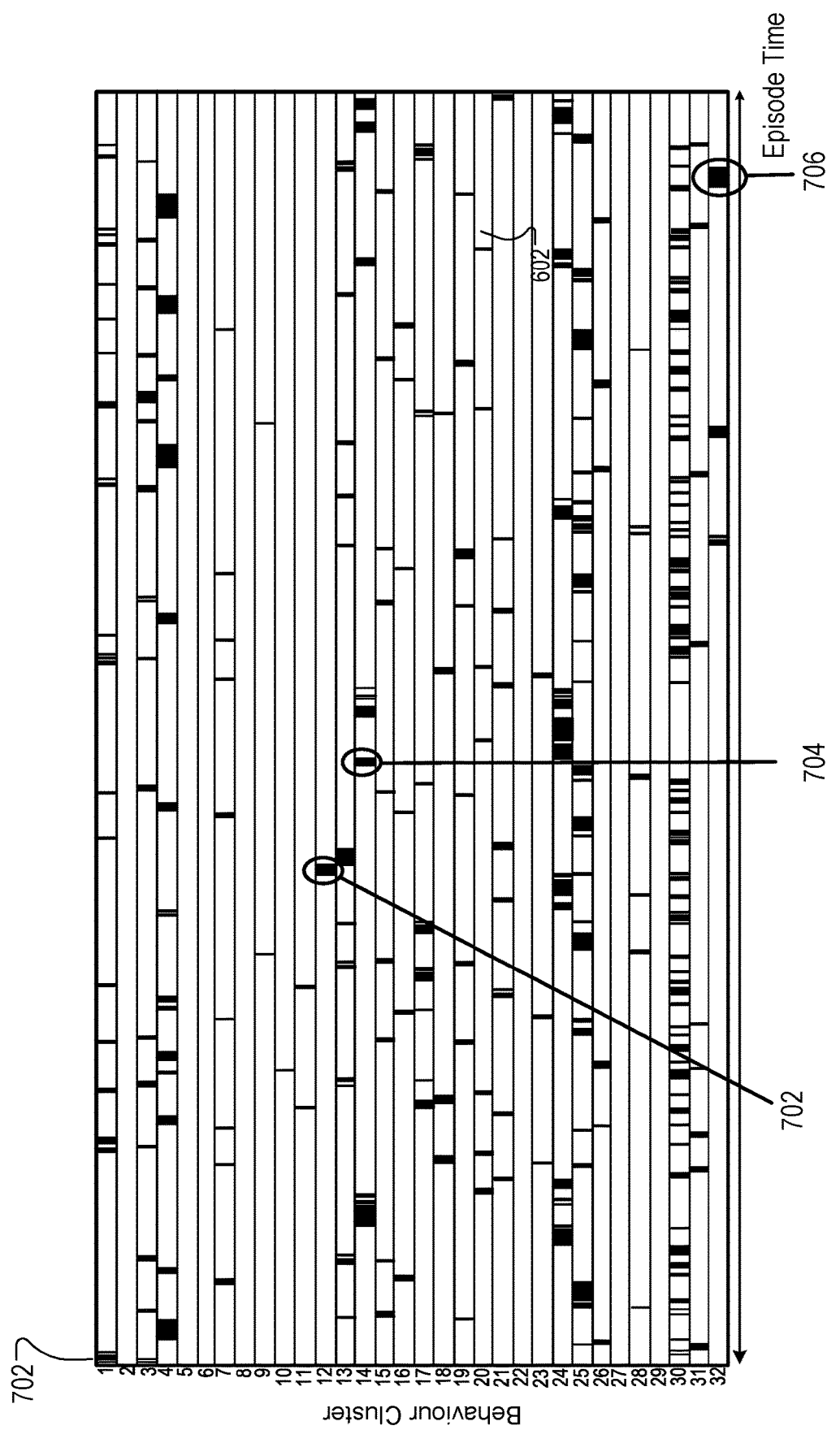
FIG. 7 shows another example of a user interface presentation of agent behavior.

FIG. 7 shows another example of a user interface presentation 700 of agent behavior. In particular, the user interface presentation 700 is a time chart that shows how frequently certain clusters of behaviors are performed as an episode of a task progresses, i.e., shows when certain clusters of behaviors are performed in terms of time within an episode ("episode time"). The presentation 700 includes a respective row for each of 32 different behavior clusters, with white bars representing time periods during the episode at which the agent was performing one or more behaviors from the cluster. For example, the white bar 702 shows that the agent was performing behaviors from cluster 12 at a particular period during the episode, the white bar 704 shows that the agent was performing behaviors from cluster 14 at a different, later period during the episode, and the white bar 706 shows that the agent was performing behaviors from cluster 32 at another, even later time period during the episode.

As with the representation 600, the system can allow the user to access more information about the behaviors, e.g., a representation of the state that the environment was in when the agent was engaging in the behavior, by mousing over, selecting, or otherwise interacting with the bars in the presentation 700.

Although the subject technologies have been described primarily within the context of a physical real-world environment, it will be appreciated that the techniques described herein may also be utilized with non-real-world environments. For instance, in some implementations the environment may be a simulated environment and the agent may be implemented as one or more computers interacting with the simulated environment.

The simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In another example, the simulated environment may be a video game and the agent may be a simulated user playing the video game. Generally, in the case of a simulated environment, the observations may include simulated versions of one or more of the previously described observations or types of observations and the actions may include simulated versions of one or more of the previously described actions or types of actions.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of selecting actions to be performed by an agent interacting with an environment, the method comprising, at each of a plurality of time steps:
   receiving an observation characterizing a current state of the environment at the time step; and
   selecting an action to be performed by the agent in response to the observation based on (i) the observation, (ii) a first prior distribution over possible latent variables generated from a hidden state of a slow updating recurrent neural network that is updated at less than every time step, and (iii) a posterior distribution over the possible latent variables generated from a hidden state of a fast updating recurrent neural network that is updated at every time step, the selecting comprising:
   determining whether criteria for updating the hidden state of the slow updating recurrent neural network that is updated at less than every time step are satisfied at the time step;
   when the criteria are satisfied, processing a slow updating input, comprising the hidden state of the fast updating recurrent neural network that is updated at every time step, to update the hidden state of the slow updating recurrent neural network;
   processing a fast updating input for the time step comprising (i) the observation, (ii) the hidden state of the slow updating recurrent neural network using the fast updating recurrent neural network, and (iii) data defining the first prior distribution over possible latent variables to update the hidden state of the fast updating recurrent neural network to generate an updated hidden state of the fast updating recurrent neural network, wherein the first prior distribution is generated from the hidden state of the slow updating recurrent neural network as of the preceding time step;
   after updating the hidden state of the fast updating recurrent neural network:
      generating, from the updated hidden state of the fast updating recurrent neural network, the posterior distribution over possible latent variables;
      sampling a latent variable from the posterior distribution; and
      selecting the action to be performed by the agent based on the latent variable sampled from the posterior distribution; and
   updating parameters of the fast updating recurrent neural network, comprising:
      generating, from the hidden state of the slow updating recurrent neural network, a second prior distribution over possible latent variables; and
      updating the parameters of the fast updating recurrent neural network based at least in part on a divergence between (i) the second prior distribution generated from the hidden state of the slow updating recurrent neural network and (ii) the posterior distribution generated from the updated hidden state of the fast updating recurrent neural network.

2. The method of claim 1, further comprising, at each of the plurality of time steps:
   when the criteria are not satisfied, refraining from updating the hidden state of the slow updating recurrent neural network before the hidden state is used as part of the input to the fast updating recurrent neural network for the time step.

3. The method of claim 1, wherein the criteria are satisfied at less than all of the plurality of time steps.

4. The method of claim 1, wherein the criteria are satisfied every N time steps, and wherein N is a fixed integer great than one.

5. The method of claim 1, further comprising, at each of the plurality of time steps:
   determining a difference measure between the observation at the time step and the observation at the last time step at which the hidden state of the slow updating recurrent neural network was updated, wherein the criteria are satisfied at the time step only when the difference measure satisfies a threshold.

6. The method of claim 1, wherein generating the posterior distribution, from the updated hidden state of the fast updating recurrent neural network, over possible latent variables, comprises:
   generating, from the updated hidden state of the fast updating recurrent neural network, posterior parameters of the posterior distribution over possible latent variables.

7. The method of claim 1, wherein selecting the action comprises:
   processing the sampled latent variable using a policy neural network to generate a policy output, and
   selecting the action using the policy output.

8. The method of claim 1, wherein the fast updating input further comprises the latent variable sampled at the preceding time step.

9. The method of claim 1, wherein generating the second prior distribution, from the hidden state of the slow updating recurrent neural network, comprises:
   generating, from the hidden state of the slow updating recurrent neural network, prior parameters of the second prior distribution over possible latent variables.

10. The method of claim 1, wherein the data defining the first prior distribution are the prior parameters of the first prior distribution generated at the preceding time step.

11. The method of claim 1, further comprising:
   obtaining a reward in response to the agent performing the selected action; and
   wherein updating the parameters of the fast updating recurrent neural network comprises updating the parameters of the fast updating recurrent neural network based on the selected action and the reward using a reinforcement learning technique.

12. The method of claim 1, wherein updating the parameters of the fast updating recurrent neural network comprises minimizing the divergence between the second prior distribution and the posterior distribution to regularize the latent variable.

13. The method of claim 11, further comprising, at each of the plurality of time steps, generating, using the updated hidden state of the fast updating recurrent neural network, a value output that is an estimate of a return resulting from the environment being in the current state, and wherein the updating comprises updating the parameters of the fast updating recurrent neural network based on the reward, the selected action, and the value output using an actor-critic technique.

14. The method of claim 11, further comprising, at each of the plurality of time steps:

generating a respective auxiliary output for each of one or more auxiliary tasks using the updated hidden state of the fast updating recurrent neural network; and for each of the one or more auxiliary tasks, training the fast and slow updating recurrent neural networks on the auxiliary task based on the auxiliary output for the auxiliary task.

15. The method of claim 11, wherein obtaining the reward comprises:
obtaining data extracted from the environment after the selected action is performed, and
mapping the obtained data to the reward using a reward mapping.

16. The method of claim 1, wherein the slow updating recurrent neural network and the fast updating recurrent neural network share an external memory.

17. The method of claim 1, further comprising, at each of the plurality of time steps:
causing the agent to perform the selected action.

18. A system comprising one or more computers and one or more storage devices storing instructions that when executed by the one or more computers cause the one or more computers to perform operations for selecting actions to be performed by an agent interacting with an environment, the operations comprising, at each of a plurality of time steps:
receiving an observation characterizing a current state of the environment at the time step; and
selecting an action to be performed by the agent in response to the observation based on (i) the observation, (ii) a first prior distribution over possible latent variables generated from a hidden state of a slow updating recurrent neural network that is updated at less than every time step, and (iii) a posterior distribution over the possible latent variables generated from a hidden state of a fast updating recurrent neural network that is updated at every time step, the selecting comprising:
determining whether criteria for updating the hidden state of the slow updating recurrent neural network that is updated at less than every time step are satisfied at the time step;
when the criteria are satisfied, processing a slow updating input, comprising the hidden state of the fast updating recurrent neural network that is updated at every time step, to update the hidden state of the slow updating recurrent neural network;
processing a fast updating input for the time step comprising (i) the observation, (ii) the hidden state of the slow updating recurrent neural network using the fast updating recurrent neural network, and (iii) data defining the first prior distribution over possible latent variables to update the hidden state of the fast updating recurrent neural network to generate an updated hidden state of the fast updating recurrent neural network, wherein the first prior distribution is generated from the hidden state of the slow updating recurrent neural network as of the preceding time step;
after updating the hidden state of the fast updating recurrent neural network:
generating, from the updated hidden state of the fast updating recurrent neural network, the posterior distribution over possible latent variables;
sampling a latent variable from the posterior distribution; and
selecting the action to be performed by the agent based on the latent variable sampled from the posterior distribution; and
updating parameters of the fast updating recurrent neural network, comprising:
generating, from the hidden state of the slow updating recurrent neural network, a second prior distribution over possible latent variables; and
updating the parameters of the fast updating recurrent neural network based at least in part on a divergence between (i) the second prior distribution generated from the hidden state of the slow updating recurrent neural network and (ii) the posterior distribution generated from the updated hidden state of the fast updating recurrent neural network.

19. The system of claim 18, further comprising, at each of the plurality of time steps:
when the criteria are not satisfied, refraining from updating the hidden state of the slow updating recurrent neural network before the hidden state is used as part of the input to the fast updating recurrent neural network for the time step.

20. The system of claim 18, wherein the criteria are satisfied every N time steps, and wherein N is a fixed integer great than one.

21. The system of claim 18, further comprising, at each of the plurality of time steps:
determining a difference measure between the observation at the time step and the observation at the last time step at which the hidden state of the slow updating recurrent neural network was updated, wherein the criteria are satisfied at the time step only when the difference measure satisfies a threshold.

22. The system of claim 18, wherein generating the posterior distribution, from the updated hidden state of the fast updating recurrent neural network, over possible latent variables, comprises:
generating, from the updated hidden state of the fast updating recurrent neural network, posterior parameters of the posterior distribution over possible latent variables.

23. The system of claim 18, wherein selecting the action comprises:
processing the sampled latent variable using a policy neural network to generate a policy output, and
selecting the action using the policy output.

24. The system of claim 18, wherein generating the second prior distribution, from the hidden state of the slow updating recurrent neural network, comprises:
generating, from the hidden state of the slow updating recurrent neural network, prior parameters of the second prior distribution over possible latent variables.

25. The system of claim 18, further comprising:
obtaining a reward in response to the agent performing the selected action; and
wherein updating the parameters of the fast updating recurrent neural network comprises updating the parameters of the fast updating recurrent neural network based on the selected action and the reward using a reinforcement learning technique.

26. The system of claim 18, wherein updating the parameters of the fast updating recurrent neural network comprises minimizing the divergence between the second prior distribution and the posterior distribution to regularize the latent variable.

27. The system of claim 25, further comprising, at each of the plurality of time steps, generating, using the updated hidden state of the fast updating recurrent neural network, a value output that is an estimate of a return resulting from the environment being in the current state, and wherein the updating comprises updating the parameters of the fast updating recurrent neural network based on the reward, the selected action, and the value output using an actor-critic technique.

28. The system of claim 25, further comprising, at each of the plurality of time steps:
generating a respective auxiliary output for each of one or more auxiliary tasks using the updated hidden state of the fast updating recurrent neural network; and
for each of the one or more auxiliary tasks, training the fast and slow updating recurrent neural networks on the auxiliary task based on the auxiliary output for the auxiliary task.

29. The system of claim 25, wherein obtaining the reward comprises:
obtaining data extracted from the environment after the selected action is performed, and
mapping the obtained data to the reward using a reward mapping.

30. One or more non-transitory computer-readable storage media storing instructions that when executed by one or more computers cause the one or more computers to perform operations for selecting actions to be performed by an agent interacting with an environment, the operations comprising, at each of a plurality of time steps:
receiving an observation characterizing a current state of the environment at the time step; and
selecting an action to be performed by the agent in response to the observation based on (i) the observation, (ii) a first prior distribution over possible latent variables generated from a hidden state of a slow updating recurrent neural network that is updated at less than every time step, and (iii) a posterior distribution over the possible latent variables generated from a hidden state of a fast updating recurrent neural network that is updated at every time step, the selecting comprising:
determining whether criteria for updating the hidden state of the slow updating recurrent neural network that is updated at less than every time step are satisfied at the time step;
when the criteria are satisfied, processing a slow updating input, comprising the hidden state of the fast updating recurrent neural network that is updated at every time step, to update the hidden state of the slow updating recurrent neural network;
processing a fast updating input for the time step comprising (i) the observation, (ii) the hidden state of the slow updating recurrent neural network using the fast updating recurrent neural network, and (iii) data defining the first prior distribution over possible latent variables to update the hidden state of the fast updating recurrent neural network to generate an updated hidden state of the fast updating recurrent neural network, wherein the first prior distribution is generated from the hidden state of the slow updating recurrent neural network as of the preceding time step;
after updating the hidden state of the fast updating recurrent neural network:
generating, from the updated hidden state of the fast updating recurrent neural network, the posterior distribution over possible latent variables;
sampling a latent variable from the posterior distribution; and
selecting the action to be performed by the agent based on the latent variable sampled from the posterior distribution; and
updating parameters of the fast updating recurrent neural network, comprising:
generating, from the hidden state of the slow updating recurrent neural network, a second prior distribution over possible latent variables; and
updating the parameters of the fast updating recurrent neural network based at least in part on a divergence between (i) the second prior distribution generated from the hidden state of the slow updating recurrent neural network and (ii) the posterior distribution generated from the updated hidden state of the fast updating recurrent neural network.

* * * * *